(12) United States Patent
Zhou et al.

(10) Patent No.: US 9,203,517 B2
(45) Date of Patent: Dec. 1, 2015

(54) SIGNAL TRANSMISSION METHOD, SIGNAL RECEIVING METHOD, PASSIVE OPTICAL NETWORK PON DEVICE, AND PON SYSTEM

(71) Applicants: Huawei Technologies Co., Ltd., Shenzhen, Guangdong (CN); The Hong Kong Polytechnic University, Kowloon, Hong Kong (CN)

(72) Inventors: Lei Zhou, Shenzhen (CN); Guo Wei, Shenzhen (CN); Chao Lv, Shenzhen (CN); Dawei Wang, Shenzhen (CN); Botao Liu, Shenzhen (CN)

(73) Assignees: Hong Kong Polytechnic University, Hong Kong (CN); Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/209,221

(22) Filed: Mar. 13, 2014

(65) Prior Publication Data
US 2014/0193152 A1 Jul. 10, 2014

Related U.S. Application Data

(63) Continuation of application No. PCT/CN2011/079683, filed on Sep. 15, 2011.

(51) Int. Cl.
*H04B 10/00* (2013.01)
*H04B 10/27* (2013.01)
(Continued)

(52) U.S. Cl.
CPC .............. *H04B 10/27* (2013.01); *H04B 10/532* (2013.01); *H04B 10/614* (2013.01); *H04B 10/6151* (2013.01); *H04J 14/02* (2013.01)

(58) Field of Classification Search
CPC .............. H04B 10/532; H04B 10/614; H04B 10/6151; H04B 10/66; H04B 10/676; H04J 14/06
USPC .................................................. 398/152, 184
See application file for complete search history.

(56) References Cited

U.S. PATENT DOCUMENTS

| 4,916,705 A | 4/1990 | Glance |
| 7,526,211 B2 | 4/2009 | McNicol et al. |

(Continued)

FOREIGN PATENT DOCUMENTS

| CN | 101753252 A | 6/2010 |
| CN | 101860500 A | 10/2010 |

(Continued)

OTHER PUBLICATIONS

Miyazaki, "Linewidth-Tolerant QPSK Homodyne Transmission Using a Polarization-Multiplexed Pilot Carrier," IEEE Photonics Technology Letters, vol. 18, No. 2, pp. 388-390, Institute of Electrical and Electronics Engineers, New York, New York (Jan. 15, 2006).

(Continued)

*Primary Examiner* — Daniel Dobson
(74) *Attorney, Agent, or Firm* — Leydig, Voit & Mayer, Ltd.

(57) ABSTRACT

Embodiments of the present disclosure relate to a signal transmission method The signal receiving method includes: receiving a first transmit signal, where the first transmit signal includes a first polarized optical signal and a second polarized optical signal that are perpendicular to each other, where the first polarized optical signal is loaded with first data, the first transmit signal is an uplink signal, and the first data is uplink data, or, the first transmit signal is a downlink signal, and the first data is downlink data; splitting the first transmit signal into a first signal and a second signal according to power; separately rotating a first polarized optical signal and a second polarized optical signal of the second signal by 90 degrees; and performing coherent mixing on the rotated second signal and the first signal to obtain the first data.

16 Claims, 11 Drawing Sheets

(51) Int. Cl.
*H04B 10/61* (2013.01)
*H04B 10/532* (2013.01)
*H04J 14/02* (2006.01)

(56) References Cited

U.S. PATENT DOCUMENTS

| | | | | |
|---|---|---|---|---|
| 2005/0117915 | A1* | 6/2005 | Miyazaki | 398/188 |
| 2010/0196008 | A1 | 8/2010 | Szafraniec et al. | |
| 2012/0027410 | A1 | 2/2012 | Xu et al. | |

FOREIGN PATENT DOCUMENTS

| | | |
|---|---|---|
| CN | 101951294 A | 1/2011 |
| CN | 102088328 A | 6/2011 |
| CN | 102143407 A | 8/2011 |
| EP | 2256959 A2 | 12/2010 |
| JP | 2005020254 A | 1/2005 |
| JP | 2007116676 A | 5/2007 |
| WO | WO 03032530 A1 | 4/2003 |

OTHER PUBLICATIONS

Rohde et al., "Coherent Optical Access Networks," Optical Fiber Communication Conference, Los Angeles, California, Optical Society of America, Washington D.C. (Mar. 6-11, 2011).

Qian et al., "108 Gb/s OFDMA-PON With Polarization Multiplexing and Direct Detection," Journal of Lightwave Technology, pp. 484-493, vol. 28 No. 4, Institute of Electrical and Electronics Engineers, New York, New York (Feb. 15, 2010).

Bakhshi et al., "Advantages of orthogonal polarization launch in a 6,500 km straight-line DWDM transmission experiment," Optical Fiber Communication Conference and Exhibit, pp. 296-298, Institute of Electrical and Electronics Engineers, New York, New York (Mar. 17-22, 2002).

Adhikari et al., "Experimental Investigation of Self Coherent Optical OFDM Systems Using Fabry-Perot Filters for Carrier Extraction," 36th European Conferences and Exhibition on Optical Communication, pp. 1-3, Torino, Italy, Institute of Electrical and Electronics Engineers, New York, New York (Sep. 19-23, 2010).

Cho et al., "Long-Reach Coherent WDM PON Employing Self-Polarization-Stabilization Technique," Journal of Lightwave Technology, pp. 456-462, vol. 29 No. 4, Institute of Electrical and Electronics Engineers, New York, New York (Feb. 15, 2011).

* cited by examiner

SIGNAL TRANSMISSION METHOD, SIGNAL RECEIVING METHOD, PASSIVE OPTICAL NETWORK PON DEVICE, AND PON SYSTEM

CROSS-REFERENCE TO RELATED APPLICATIONS

This application is a continuation of International Patent Application No. PCT/CN2011/079683, filed on Sep. 15, 2011. This application is hereby incorporated by reference in its entirety.

TECHNICAL FIELD

Embodiments of the present disclosure relate to the field of communication technologies, and in particular, to signal transmission methods, signal receiving methods, passive optical network PON devices, and PON systems.

BACKGROUND

Currently, a passive optical network (Passive Optical Network, PON) has gradually become a mainstream technology in a broadband access field. With rapid development of various broadband services, for example, video conference, three-dimensional (Three-Dimensional, 3D) television, mobile backhaul, and interactive game, higher requirements are imposed on an access bandwidth. On an optical communication network, especially a PON system with a very tight power budget, sensitivity of a receiver plays a critical role. In a coherent reception technology, a local-oscillator light with relatively high power is introduced to amplify a received signal, and meanwhile a optoelectronic receiver works in a shot noise-dominant state, so that a shot noise limit of the receiver can be reached, thereby greatly increasing the sensitivity and spectral efficiency of the receiver.

In the prior art, a central office device, optical line terminal (Optical Line Terminate, OLT), generates ultra-dense wavelength division multiplexing (UD-WDM) signals with a C-band wavelength spacing of 3 GHz, which are received by each optical network unit (Optical Network Unit, ONU) through an optical distribution network (Optical Distribution Network, ODN) based on an optical splitter (splitter); a tunable laser is set on each ONU to generate a local-oscillator optical signal; by means of adjusting a wavelength of the local-oscillator optical signal to a position that has a 1 GHz difference from a target wavelength, one signal may be selected randomly from the received UWDM signals to perform coherent reception. However, in the prior art, the ONU requires a high-cost tunable laser to generate a local-oscillator optical signal, and needs to use a complex polarization diversity receiving structure to perform coherent reception on the local oscillator optical signal and a received downlink signal.

SUMMARY

Embodiments of the present disclosure provide signal transmission methods, signal receiving methods, passive optical network PON devices and PON systems to reduce complexity of the device and the system and costs.

According to one aspect, an embodiment of the present disclosure provides a transmitter, including a signal source, a polarization beam splitter, a modulator, and a polarization beam combiner, where the signal source is configured to generate an optical signal, and input the optical signal to the polarization beam splitter;

the polarization beam splitter is configured to split the optical signal into a first polarized optical signal and a second polarized optical signal that are perpendicular to each other, input the first polarized optical signal to the modulator, and input the second polarized optical signal to the polarization beam combiner;

the modulator is configured to modulate the first polarized optical signal, load first data into the first polarized optical signal, and input the modulated first polarized optical signal to the polarization beam combiner; and the polarization beam combiner is configured to synthesize the modulated first polarized optical signal and the second polarized optical signal into a first transmit signal, and transmit the first transmission signal to a receiving end.

An embodiment of the present disclosure further provides a receiver, including a first power splitter, a first director of a first optical signal, a polarization rotator of light, and a coherent receiver, where the first power splitter is configured to split a first transmission signal sent by a transmitting end into a first signal and a second signal according to power, input the first signal to the coherent receiver, and input the second signal to the first director of the first optical signal, where the first transmit signal includes a first polarized optical signal and a second polarization state optical signal that are perpendicular to each other, where the first polarized optical signal is loaded with first data;

the first director of the first optical signal is connected to the polarization rotator of light, and the first director of the first optical signal is configured to input the second signal to the polarization rotator of light; the polarization rotator of light is configured to separately rotate a first polarized optical signal and a second polarized optical signal of the second signal by 90 degrees, and input the rotated second signal to the first director of the first optical signal; and the first director of the first optical signal is further configured to input the rotated second signal to the coherent receiver; and the coherent receiver is configured to perform coherent mixing on the rotated second signal and the first signal to obtain the first data.

According to another aspect, an embodiment of the present disclosure provides a passive optical network PON central office device, including a first transmitter, where the first transmitter includes a signal source, a polarization beam splitter, a modulator, and a polarization beam combiner, where the signal source is configured to generate an optical signal, and input the optical signal to the polarization beam splitter;

the polarization beam splitter is configured to split the optical signal into a first polarized optical signal and a second polarized optical signal that are perpendicular to each other, input the first polarized optical signal to the modulator, and input the second polarized optical signal to the polarization beam combiner;

the modulator is configured to modulate the first polarized optical signal, load first data into the first polarized optical signal, and input the modulated first polarized optical signal to the polarization beam combiner; and the polarization beam combiner is configured to synthesize the modulated first polarized optical signal and the second polarized optical signal into a first transmit signal, and transmit the first transmit signal to a receiving end, where the first data is downlink data, the first transmit signal is a downlink signal, and the receiving end is a PON terminal device.

An embodiment of the present disclosure further provides a passive optical network PON terminal device, including a second receiver, where the second receiver includes a first power splitter, a first director of a first optical signal, a polarization rotator of light, and a coherent receiver, where the first power splitter is configured to split a first transmit signal sent by a transmitting end into a first signal and a second signal according to power, input the first signal to the coherent receiver, and input the second signal to the first director of the first optical signal, where the first transmit signal includes a first polarized optical signal and a second polarized optical signal that are perpendicular to each other, where the first polarized optical signal is loaded with first data;

the first director of the first optical signal is connected to the polarization rotator of light, and the first director of the first optical signal is configured to input the second signal to the polarization rotator of light; the polarization rotator of light is configured to separately rotate a first polarized optical signal and a second polarized optical signal of the second signal by 90 degrees, and input the rotated second signal to the first director of the first optical signal; and the first director of the first optical signal is further configured to input the rotated second signal to the coherent receiver; and the coherent receiver is configured to perform coherent mixing on the rotated second signal and the first signal to obtain the first data, where the first data is downlink data, the first transmit signal is a downlink signal, and the transmitting end is a PON central office device.

An embodiment of the present disclosure also provides a passive optical network PON terminal device, including a third transmitter, where the third transmitter includes a signal source, a polarization beam splitter, a modulator, and a polarization beam combiner, where the signal source is configured to generate an optical signal, and input the optical signal to the polarization beam splitter;

the polarization beam splitter is configured to split the optical signal into a first polarized optical signal and a second polarized optical signal that are perpendicular to each other, input the first polarized optical signal to the modulator, and input the second polarized optical signal to the polarization beam combiner;

the modulator is configured to modulate the first polarized optical signal, load first data into the first polarized optical signal, and input the modulated first polarized optical signal to the polarization beam combiner; and the polarization beam combiner is configured to synthesize the modulated first polarized optical signal and the second polarized optical signal into a first transmit signal, and transmit the first transmit signal to a receiving end, where the first data is uplink data, the first transmit signal is an uplink signal, and the receiving end is a PON central office device.

An embodiment of the present disclosure further provides a passive optical network PON central office device, including a fourth receiver, where the fourth receiver includes a first power splitter, a first director of a first optical signal, a polarization rotator of light, and a coherent receiver, where the first power splitter is configured to split a first transmit signal sent by a transmitting end into a first signal and a second signal according to power, input the first signal to the coherent receiver, and input the second signal to the first director of the first optical signal, where the first transmit signal includes a first polarized state optical signal and a second polarized optical signal that are perpendicular to each other, where the first polarized optical signal is loaded with first data;

the first director of the first optical signal is connected to the polarization rotator of light, and the first director of the first optical signal is configured to input the second signal to the polarization rotator of light; the polarization rotator of light is configured to separately rotate a first polarized optical signal and a second polarized optical signal of the second signal by 90 degrees, and input the rotated second signal to the first director of the first optical signal; the first director of the first optical signal is further configured to input the rotated second signal to the coherent receiver; and the coherent receiver is configured to perform coherent mixing on the rotated second signal and the first signal to obtain the first data, where the first data is uplink data, the first transmit signal is an uplink signal, and the transmitting end is a PON terminal device.

According to still another aspect, an embodiment of the present disclosure further provides a passive optical network PON system, including at least one PON central office device provided by the embodiments of the present disclosure and at least one PON terminal device provided by the embodiments of the present disclosure.

According to still another aspect, an embodiment of the present disclosure further provides a signal transmission method, including:

splitting an optical signal into a first polarized optical signal and a second polarized optical signal that are perpendicular to each other;

modulating the first polarized optical signal, and loading first data into the first polarized optical signal; and synthesizing the modulated first polarized optical signal and the second polarized optical signal into a first transmit signal, and transmit the first transmit signal to a receiving end, where the first data is uplink data and the first transmit signal is an uplink signal, or the first data is downlink data and the first transmit signal is a downlink signal.

An embodiment of the present disclosure further provides a signal receiving method, including:

receiving a first transmit signal, where the first transmit signal includes a first polarized optical signal and a second polarized optical signal that are perpendicular to each other, where the first polarized optical signal is loaded with first data, the first transmit signal is an uplink signal, and the first data is uplink data, or the first transmit signal is a downlink signal and the first data is downlink data;

splitting the first transmit signal into a first signal and a second signal according to power;

separately rotating a first polarized optical signal and a second polarized optical signal of the second signal by 90 degrees; and performing coherent mixing on the rotated second signal and the first signal to obtain the first data.

Using the signal transmission method, the signal receiving method, the passive optical network PON device, and the PON system provided by the embodiments of the present disclosure, a transmitting end modulates data to one polarization state of a transmit signal, where the other polarization state of the transmit signal is a DC optical signal; a receiving end splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a central office device or a terminal device, reducing complexity of the device and the system and reducing costs.

BRIEF DESCRIPTION OF DRAWING(S)

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
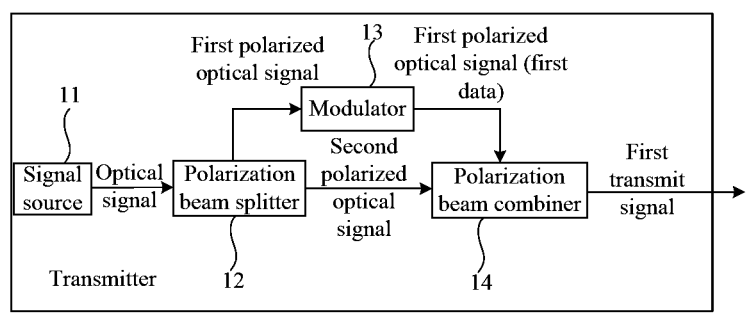
FIG. 1 is a schematic structural diagram of an embodiment of a transmitter provided by the present disclosure.

FIG. 1 is a schematic structural diagram of an embodiment of a transmitter provided by the present disclosure. As shown in FIG. 1, the transmitter includes a signal source 11, a polarization beam splitter 12, a modulator 13, and a polarization beam combiner 14, where:

the signal source 11 is configured to generate an optical signal, and input the optical signal to the polarization beam splitter 12;

the polarization beam splitter 12 is configured to split the optical signal into a first polarized optical signal and a second polarized optical signal that are perpendicular to each other, input the first polarized optical signal to the modulator 13, and input the second polarized optical signal to the polarization beam combiner 14;

the modulator 13 is configured to modulate the first polarized optical signal, load first data into the first polarized optical signal, and input the modulated first polarized optical signal to the polarization beam combiner 14; and the polarization beam combiner 14 is configured to synthesize the modulated first polarized optical signal and the second polarized optical signal into a first transmit signal, and transmit the first transmit signal to a receiving end.

The transmitter provided by this embodiment may be set on a PON central office device, for example, a central office (Central Office, CO) or an OLT. In this case, the transmitted first transmit signal is a downlink signal, the first data is downlink data, and the receiving end is a PON terminal device; or, the transmitter provided by this embodiment may also be set on a PON terminal device, for example, on an ONU. In this case, the transmitted first transmit signal is an uplink signal, the first data is uplink data, and the receiving end is a PON central office device.

The signal source 11 herein serves as a downlink light source and is configured to generate an optical signal. The signal source 11 may be various types of lasers, for example, a distributed feedback (distributed feedback, DFB) laser. The optical signal generated by the signal source 11 is split by the polarization beam splitter 12 into two polarized optical signals that are perpendicular to each other, that is, a first polarized optical signal and a second polarized optical signal. The polarization beam splitter 12 is a device with a function of performing polarization beam splitting on the optical signal, for example, a polarization beam splitter (Polarization Beam Splitter, PBS).

In this embodiment of the present disclosure, first downlink data is loaded into any one polarized optical signal (first polarized signal light) of the two polarized optical signals which are split from the optical signal. Therefore, the polarization beam splitter 12 inputs only the first polarized optical signal to the modulator 13, but directly inputs the second polarized optical signal to the polarization beam combiner 14.

The modulator 13 may be a device with a modulation function, for example, a Mach-Zehnder Modulator (Mach-Zehnder Modulator, MZM). The modulator 13 modulates the first polarized optical signal, and loads the first downlink data that needs to be sent to the terminal device into the first polarized optical signal.

The polarization beam combiner 14 may be a device with a function of polarization beam combination, for example, a polarization beam combiner (Polarization Beam Combiner, PBC). Because the second polarized optical signal is not modulated by the modulator 13, the second polarized optical signal received by the polarization beam combiner 14 is a DC optical signal. The polarization beam combiner 14 synthesizes the modulated first polarized optical signal and the second polarized optical signal into a first downlink transmit signal, and transmits the first downlink transmit signal to a receiving end of the PON terminal device through a director 15 of the optical signal. The director 15 of the optical signal is a device with a function of transmitting/receiving an optical signal on a directional basis, for example, a circulator.

It should be noted that: when a first downlink transmit signal light is transmitted in a fiber, the first polarized optical signal and the second polarized optical signal of the first downlink transmit signal rotate at random due to influences of factors such as ambient temperature, stress, and humidity. If polarization mode dispersion (Polarization Mode Dispersion, PMD) in the fiber is small enough, the first polarized optical signal and the second polarized optical signal rotate at the same time and at a same speed. Currently, commonly used various types of fibers, such as a G.652 fiber, with the PMD less than $0.06$ ps/km$^{0.5}$, can keep orthogonality between the first polarized optical signal and the second polarized optical signal during transmission.

The receiving end splits the received first transmit signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data.

Using the transmitter provided by this embodiment of the present disclosure, data is modulated to one polarization state of a transmit signal, where the other polarization state of the transmit signal is a DC optical signal; a receiving end splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a central office device or a terminal device, reducing complexity of the device and a system and reducing costs.

Figure 2:
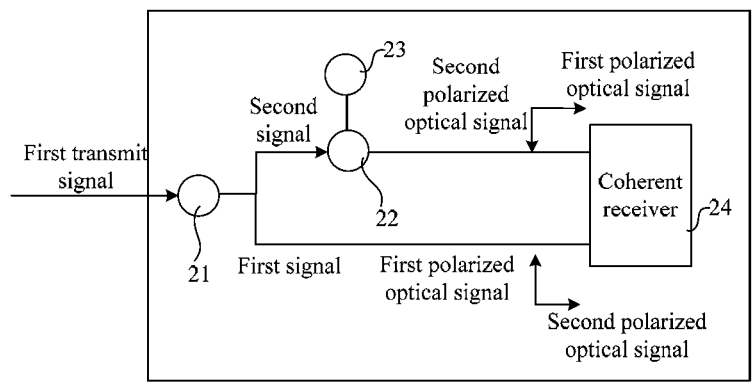
FIG. 2 is a schematic structural diagram of an embodiment of a receiver provided by the present disclosure.

FIG. 2 is a schematic structural diagram of an embodiment of a receiver provided by the present disclosure. As shown in FIG. 2, the receiver includes a power splitter 21, a director 22 of a first optical signal, a polarization rotator 23 of light, and a coherent receiver 24, where:

the first power splitter 21 is configured to split a first transmit signal sent by a transmitting end into a first signal and a second signal according to power, input the first signal to the coherent receiver 24, and input the second signal to the director 22 of the first optical signal, where the first transmit signal includes a first polarized optical signal and a second polarized optical signal that are perpendicular to each other, where the first polarized optical signal is loaded with first data;

the director 22 of the first optical signal is connected to the polarization rotator 23 of light, and the director 22 of the first optical signal is configured to input the second signal to the polarization rotator 23 of light; the polarization rotator 23 of light is configured to separately rotate a first polarized optical signal and a second polarized optical signal of the second signal by 90 degrees, and input the rotated second signal to the director 22 of the first optical signal; and the director 22 of the first optical signal is further configured to input the rotated second signal to the coherent receiver 24; and the coherent receiver 24 is configured to perform coherent mixing on the rotated second signal and the first signal to obtain the first data.

The receiver provided by this embodiment may be set on a PON central office device, for example, a CO or an OLT. In this case, the received first transmit signal is an uplink signal, the first data is uplink data, and the transmitting end is a PON terminal device; or, the transmitter provided by this embodiment may also be set on a PON terminal device, for example, on an ONU. In this case, the received first transmit signal is a downlink signal, the first data is downlink data, and the transmitting end is a PON central office device.

The first power splitter 21 is a device with a power allocation function, and can split a first downlink transmit signal sent by a PON central office device at the transmitting end into a first downlink signal and a second downlink signal according to power, directly input the first downlink signal to the coherent receiver 24, and input the second downlink signal to the director 22 of the first optical signal. Power of the first downlink signal and power of the second downlink signal are not limited, and the power of the first downlink signal may be the same as or different from the power of the second downlink signal.

The director 22 of the first optical signal may be a device with a function of transmitting/receiving an optical signal on a directional basis, for example, a circulator. The director 22 of the first optical signal is connected to the polarization rotator 23 of light, and inputs the second downlink signal to the polarization rotator 23 of light.

The polarization rotator 23 of light may be a device with a function of rotating an angle of the optical signal, for example, a Faraday rotation mirror (Faraday Rotation Mirror, FRM). After receiving the second downlink signal, the polarization rotator 23 of light can separately rotate a first polarized optical signal and a second polarized optical signal of the second downlink signal by 90 degrees, and input the rotated second optical signal to the coherent receiver 24 through the director 22 of the optical signal.

The coherent receiver 24 receives two channels of optical signals, where one channel of optical signal is the first downlink signal split from the first downlink transmit signal according to power, where two polarization directions of the first downlink signal are consistent with two polarization directions of the first downlink transmit signal and the first polarized optical signal of the first downlink signal is loaded with first downlink data; the other channel of optical signal is the second downlink signal which is rotated by 90 degrees by the polarization rotator 23 of light. Because a first polarized optical signal of a non-rotated second downlink signal is parallel to the first polarized optical signal of the first downlink signal and a second polarized optical signal of the non-rotated second downlink signal is parallel to the second polarized optical signal of the first downlink signal, the first polarized optical signal of the rotated second downlink signal is parallel to the second polarized optical signal of the first downlink signal, and the second polarized optical signal of the rotated second downlink signal is parallel to the first polarized optical signal of the first downlink signal. However, in the first downlink signal and the rotated second downlink signal, the first polarized optical signal is loaded with the first downlink data, while the second polarized optical signal is a DC optical signal.

Therefore, after receiving the rotated second downlink signal and the first downlink signal, the coherent receiver 24 can use the non-modulated second polarized optical signal of the rotated second downlink signal as a local-oscillator light, and perform coherent mixing on the non-modulated second polarized optical signal and the first polarized optical signal loaded with the first downlink data in the first downlink signal. Similarly, the coherent receiver 24 can also use the non-modulated second polarized optical signal of the first downlink signal as a local-oscillator light, and perform coherent mixing on the non-modulated second polarized optical signal and the rotated first polarized optical signal loaded with the first downlink data in the second downlink signal. In this way, the first downlink data sent by the PON central office device at the transmitting end is obtained.

In this embodiment, because two polarized optical signals that undergo coherent mixing are optical signals generated by a same laser, the local-oscillator light and the optical signal loaded with data have a same wavelength, which meets a homodyne coherent reception condition. In this way, a baseband signal can be directly demodulated after the coherent mixing is performed, which reduces working bandwidths of each part of the coherent receiver 24, thereby reducing power consumption.

Using the receiver of the passive optical network PON terminal device provided by this embodiment of the present disclosure, a transmitting end modulates data to one polarization state of a transmit signal, where the other polarization state of the transmit signal is a DC optical signal; the receiver splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a central office device or the terminal device, reducing complexity of the device and a system and reducing costs.

Figure 3:
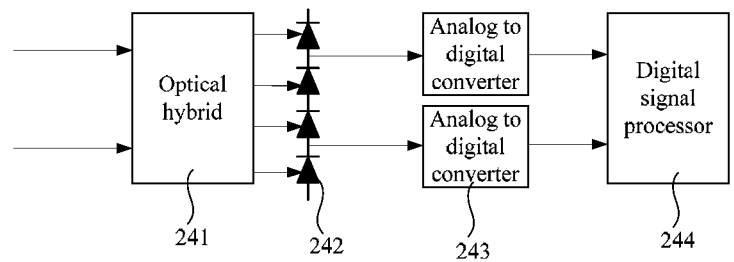
FIG. 3 is a schematic structural diagram of a coherent receiver in a receiver provided by an embodiment of the present disclosure.

Optionally, in the receiver provided by this embodiment, the second polarized optical signal which is in the first signal and the second downlink signal and is not modulated by the PON central office device is used as a local-oscillator light. Therefore, the coherent receiver 24 does not need to use a polarization diversity structure. As shown in FIG. 3, this embodiment provides a feasible structure of the coherent receiver 24, which may include an optical hybrid 241, an optical-to-electrical converter 242, an analog to digital converter 243, and a digital signal processor 244.

The optical hybrid 241 is configured to perform coherent mixing on a rotated second signal and a first signal to output four channels of optical signals.

The optical-to-electrical converter 242 is configured to perform optical-to-electrical conversion on the four channels of optical signals to output two channels of electrical signals.

The analog to digital converter 243 is configured to perform analog to digital conversion on the two channels of electrical signals.

The digital signal processor 244 is configured to perform digital processing on two channels of electrical signals that are output after the analog to digital conversion to obtain first data.

In the structure of the coherent receiver 24 provided in this embodiment, functions of and executable operations on each device are the prior art, which are not further described herein.

After the second signal rotated by 90 degrees and the non-rotated first signal are input to the coherent rotator 24, the polarized optical signal loaded with downlink data is parallel to the polarized optical signal that is not loaded with first data, which meets a coherent condition of light. Therefore, coherent reception can be performed accurately. As shown in FIG. 3, the coherent receiver 24 avoids using a complex polarization diversity structure and reduces the numbers of optical devices and electronic devices, thereby greatly reducing costs.

Optionally, the director 22 of the first optical signal may be a circulator, where the circulator includes a first input port, a second input port, a first output port, and a second output port.

The first input port is configured to receive a first transmit signal, and input the first transmit signal to a polarization rotator of light through the first output port; the second input port is configured to receive a rotated second signal, and input the rotated second signal to a first coherent receiver through the second output port.

Figure 4:
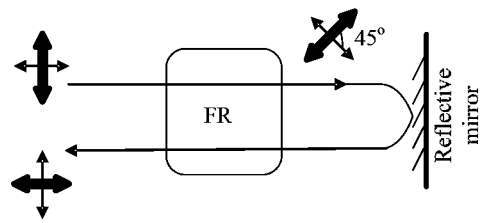
FIG. 4 is a schematic structural diagram of an FRM in a receiver provided by an embodiment of the present disclosure.

Optionally, the polarization rotator 23 of light provided by this embodiment may be a Faraday rotation mirror FRM. As shown in FIG. 4, the polarization rotator of light is a Faraday rotation mirror FRM, where the FRM includes a Faraday rotator (Faraday Rotator, FR) and a reflective mirror.

The FR is configured to separately rotate a first polarized optical signal and a second polarized optical signal of a second signal by 45 degrees, where the second signal that has been rotated by 45 degrees is reflected back to the FR by the reflective mirror, and the FR separately rotates the first polarized optical signal and the second polarized optical signal of the second signal that have been rotated by 45 degrees by 45 degrees again.

Figure 5:
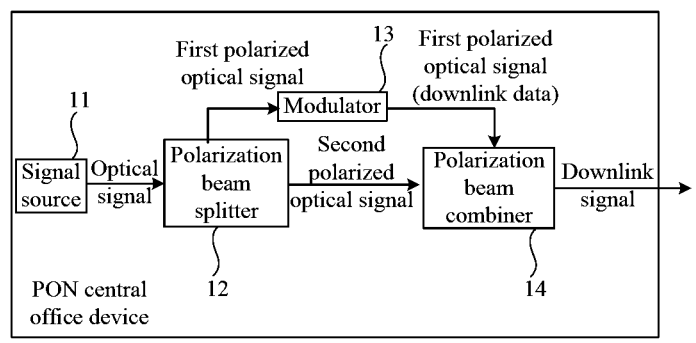
FIG. 5 is a schematic structural diagram of an embodiment of a PON central office device provided by the present disclosure.

FIG. 5 is a schematic structural diagram of an embodiment of a PON central office device provided by the present disclosure. As shown in FIG. 5, the PON central office device may be a PON side device such as an OLT and a CO. The PON central office device may include a transmitter provided by an embodiment of the present disclosure, where the transmitter is named a first transmitter herein. As shown in FIG. 1, the structure of the first transmitter specifically includes a signal source 11, a polarization beam splitter 12, a modulator 13, and a polarization beam combiner 14. First data transmitted by the first transmitter is downlink data, the first transmit signal is a downlink signal, and a receiving end of the first transmit device is a PON terminal device.

The signal source 11 serves as a downlink light source and is configured to generate an optical signal; the signal source 11 may be various types of lasers. The optical signal generated by the signal source 11 is split by the polarization beam splitter 12 into two polarized optical signals that are perpendicular to each other, that is, a first polarized optical signal and a second polarized optical signal. The polarization beam splitter 12 inputs only the first polarized optical signal to the modulator 13, but directly inputs the second polarized optical signal to the polarization beam combiner 14. The modulator 13 modulates the first polarized optical signal, and loads downlink data that needs to be sent to the terminal device into the first polarized optical signal.

Because the second polarized optical signal is not modulated by the modulator 13, the second polarized optical signal received by the polarization beam combiner 14 is a DC optical signal. The polarization beam combiner 14 synthesizes the modulated first polarized signal light and the second polarized optical signal into a downlink signal, and transmits the downlink signal to the PON terminal device.

After receiving the downlink signal, the PON terminal device splits the downlink signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data.

Using the passive optical network PON central office device provided by this embodiment of the present disclosure, data is modulated to one polarization state of a transmit signal, where the other polarization state of the transmit signal is a DC optical signal; a PON terminal device splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a terminal device, reducing complexity of the device and a system and reducing costs.

Figure 6:
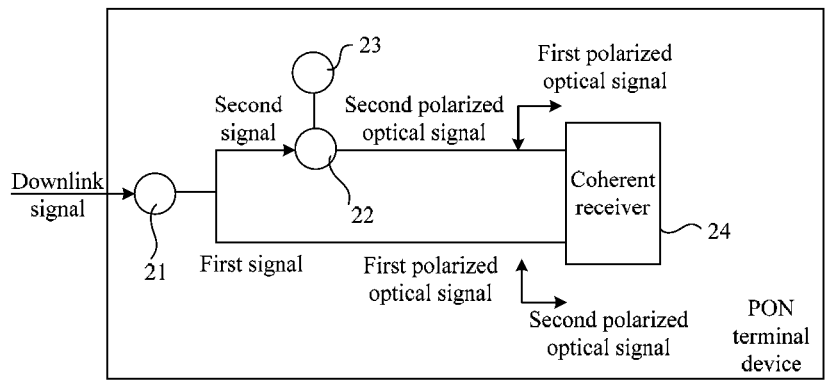
FIG. 6 is a schematic structural diagram of an embodiment of a PON terminal device provided by the present disclosure.

FIG. 6 is a schematic structural diagram of an embodiment of a PON terminal device provided by the present disclosure. As shown in FIG. 6, the terminal device may be an ONU and the like. The terminal device may include a receiver provided by an embodiment of the present disclosure, where the receiver is named as a second receiver. As shown in FIG. 2, the structure of the second receiver may specifically include a first power splitter 21, a director 22 of an optical signal, a polarization rotator 23 of light, and a coherent receiver 24, where the first data is downlink data, the first transmit signal is a downlink signal, and the transmitting end is a PON central office device.

The first power splitter 21 can split a downlink signal sent by the PON central office device into a first signal and a second signal according to power, directly input the first signal to the coherent receiver 24, and input the second signal to the director 22 of the optical signal. Power of the first signal and power of the second signal are not limited, and the power of the first signal may be the same as or different from the power of the second signal.

The director 22 of the first optical signal is connected to the polarization rotator 23 of light, and inputs the second signal to the polarization rotator 23 of light. After receiving the second signal, the polarization rotator 23 of light can separately rotate a first polarized optical signal and a second polarized optical signal of the second signal by 90 degrees, and input the rotated second optical signal to the coherent receiver 24 through the director 22 of the optical signal.

The coherent receiver 24 receives two channels of optical signals, where one channel of optical signal is the first signal split from the downlink signal according to power, where two polarization directions of the first signal are consistent with two polarization directions of the downlink signal and a first polarized optical signal of the first signal is loaded with downlink data; the other channel of optical signal is the second signal that is rotated by 90 degrees by the polarization rotator 23 of light. Because a first polarized optical signal of a non-rotated second signal is parallel to the first polarized optical signal of the first signal and a second polarized optical signal of the non-rotated second signal is parallel to the second polarized optical signal of the first signal, the first polarized optical signal of the rotated second signal is parallel to the second polarized optical signal of the first signal, and the second polarized optical signal of the rotated second signal is parallel to the first polarized optical signal of the first signal. However, in the first signal and the rotated second signal, the first polarized optical signal is loaded with the downlink data, while the second polarized optical signal is a DC optical signal.

Therefore, after receiving the rotated second signal and the first signal, the coherent receiver 24 can use the non-modulated second polarized optical signal of the rotated second signal as a local-oscillator light, and perform coherent mixing on the non-modulated second polarized optical signal and the first polarized optical signal loaded with the downlink data in the first signal. Similarly, the coherent receiver 24 may also use the non-modulated second polarized optical signal of the first signal as a local oscillator, and perform coherent mixing on the non-modulated second polarized and the first polarized optical signal loaded with the downlink data in the rotated second signal. In this way, the downlink data sent by the PON central office device is obtained.

In this embodiment, because two polarized optical signals that undergo coherent mixing are optical signals generated by a same laser, the local-oscillator light and the optical signal loaded with data have a same wavelength, which meets a homodyne coherent reception condition. In this way, a baseband signal can be directly demodulated after the coherent mixing is performed, which reduces working bandwidths of each part of the coherent receiver 24, thereby reducing power consumption.

Using the passive optical network PON terminal device provided by this embodiment of the present disclosure, a PON central office device modulates downlink data to one polarization state of a downlink signal, where the other polarization state of the downlink signal is a DC optical signal, so that the PON terminal device splits a received downlink signal into two signals according to power, and separately rotates two polarization states of one of the two signals by 90 degrees; a polarized optical signal loaded with downlink data, in one signal split by the terminal device from the downlink signal, is parallel to a DC optical signal in the other signal. In this way, a DC optical signal in the two signals split from the downlink signal is used as a local-oscillator optical signal, and coherent mixing is performed on the DC optical signal and the polarized optical signal loaded with the downlink data, thereby avoiding using a laser and a polarization diversity structure on the terminal device, reducing complexity of the device and a system and reducing costs.

Figure 7:
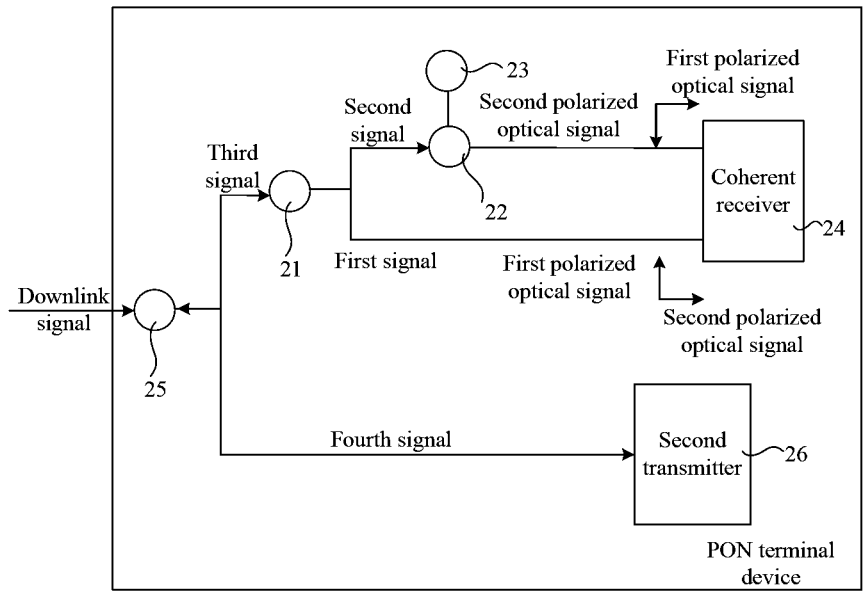
FIG. 7 is a schematic structural diagram of another embodiment of a PON terminal device provided by the present disclosure.

FIG. 7 is a schematic structural diagram of another embodiment of a PON terminal device provided by the present disclosure. As shown in FIG. 7, on the basis of one embodiment of the PON terminal device illustrated in FIG. 6, optionally, the PON terminal device may further include a second power splitter 25 and a second transmitter 26, where:

the second power splitter 25 is configured to split a downlink signal sent by a PON central office device into a third signal and a fourth signal according to power, input the third signal to the first power splitter for coherent reception, and input the fourth signal to the second transmitter 26; and the second transmitter 26 is configured to modulate the fourth signal, load uplink data into a first polarized optical signal and a second polarized optical signal of the fourth signal, and transmit the modulated fourth signal as an uplink signal to the PON central office device.

In this embodiment, after receiving the downlink signal, the PON terminal device may further split a downlink signal with a part of power from the received downlink signal to load uplink data, and then transmit the downlink signal with a part of power loaded with the data as an upstream signal to the PON central office device. In this way, the downlink signal sent by the PON central office device has the same wavelength as the uplink signal sent by the PON terminal device.

The second power splitter 25 is a device with a power allocation function, and can split the downlink signal sent by the PON central office device into a third signal and a fourth signal according to power, and input the third signal to the first power splitter 21 to perform the foregoing coherent mixing operation, but input the fourth signal to the second transmitter 26 to load the uplink data. Power of the third signal and power of the fourth signal are not limited, and the power of the third signal may be the same as or different from the power of the fourth signal.

The second transmitter 26 may be a device with transmission and modulation functions, for example, a reflective semiconductor optical amplifier (Reflective Semiconductor Optical Amplifier, RSOA). The second transmitter 26 concurrently modulates a first polarized optical signal and a second polarized optical signal of the fourth signal. In the PON central office device, the downlink data is modulated to the first polarized optical signal. Therefore, after the first polarized optical signal of the fourth signal is modulated by the second transmitter 26, the first polarized optical signal of the fourth signal is equivalently modulated twice at the PON central office device side and the PON terminal device side, and data loaded into the first polarized optical signal of the fourth signal becomes invalid data. However, because the second polarized optical signal of the fourth signal is not loaded with the downlink signal in the PON central office device, after the second polarized optical signal of the fourth signal is modulated by the second transmitter 26, valid uplink data is loaded into the second polarized optical signal of the fourth signal. After modulating the fourth signal, the second transmitter 26 uses the fourth signal loaded with the uplink data as an uplink signal, and transmits the fourth signal to the PON central office device.

Optionally, the coherent receiver 24 of the PON terminal device provided by this embodiment may also use the structure illustrated in FIG. 3.

After the second signal rotated by 90 degrees and the non-rotated first signal are input to the coherent rotator 24, the polarized optical signal loaded with the downlink data is parallel to the polarized optical signal that is not loaded with the downlink data, which meets a coherent condition of light. Therefore, coherent reception can be performed accurately and the use of a complex polarization diversity structure is avoided, thereby reducing the numbers of optical devices and electronic devices and greatly reducing costs.

Optionally, in this embodiment, the director 22 of the first optical signal included in the receiver of the PON terminal device may be a circulator, where the circulator includes a first input port, a second input port, a first output port, and a second output port.

The first input port is configured to receive the second signal, and input the downlink signal to the polarization rotator 23 of light through the first output port; the second input port is configured to receive the rotated second signal, and input the rotated second signal to the coherent receiver 24 through the second output port.

Optionally, the polarization rotator 23 of light provided by this embodiment may use the Faraday rotation mirror FRM illustrated in FIG. 4.

Figure 8:
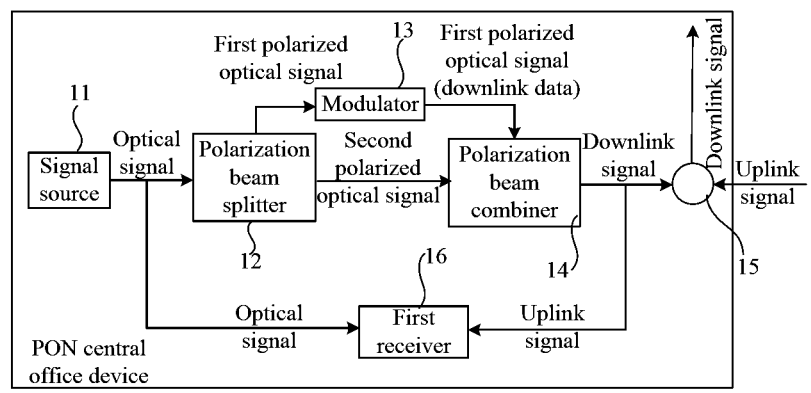
FIG. 8 is a schematic structural diagram of another embodiment of a PON central office device provided by the present disclosure.

FIG. 8 is a schematic structural diagram of another embodiment of a PON central office device provided by the present disclosure. As shown in FIG. 8, on the basis of the PON central office device illustrated in FIG. 5, the PON central office device may further include a director 15 of a second optical signal and a first receiver 16, where:

the director 15 of the second optical signal is configured to transmit the downlink signal synthesized by the polarization beam combiner 14 to the PON terminal device, receive an uplink signal sent by the PON terminal device, and input the uplink signal to the first receiver 16, where the uplink signal includes a first polarized optical signal and a second polarized optical signal that are perpendicular to each other, where the first polarized optical signal and the second polarized optical signal are loaded with uplink data; and the signal source 11 may be further configured to input a generated optical signal to the first receiver 16.

Accordingly, the first receiver 16 is configured to perform coherent mixing on the second transmit signal and the optical signal to obtain the uplink data.

In this embodiment, if the PON terminal device splits a downlink signal with a part of power from the received downlink signal to load uplink data, the uplink signal and the local-oscillator light that undergo coherent mixing in the PON central office device are optical signals generated by a same laser. Therefore, the local oscillator has the same wavelength as the uplink signal, which meets a homodyne coherent reception condition. In this way, a baseband signal can be demodulated directly after the coherent mixing is performed, which reduces working bandwidths of each part in the first receiver 16, thereby reducing power consumption.

Further, in the embodiment of the PON terminal device illustrated in FIG. 7, the second transmitter 26 of the PON terminal device loads the uplink data into the first polarized optical signal and the second polarized optical signal of the fourth signal split from the downlink signal, but the first polarized optical signal has been loaded with the downlink data. Therefore, the first polarized optical signal of the uplink signal received by the PON central office device has undergone modulation twice, and data loaded into the first polarized optical signal becomes invalid data; however, the second polarized optical signal of the uplink signal has undergone modulation only once on the PON terminal device, and data loaded into the second polarized optical signal is valid uplink data. Therefore, the coherent receiver 24 on the PON central office device can demodulate, using various algorithms, the uplink data loaded into the second polarized optical signal of the uplink signal.

As a feasible implementation manner, in this embodiment, the first receiver 16 can demodulate, using a constant modulus algorithm (Constant Modulus Algorithm, CMA), the first polarized optical and the second polarized optical signal which are perpendicular to each other in the uplink signal and are loaded with the uplink data to obtain the uplink data loaded into the second polarized optical signal of the uplink signal and discard the invalid data loaded into the second polarized optical signal of the uplink signal. The CMA is a valid polarization state demultiplexing algorithm and can correctly demodulate two polarized optical signals of the uplink signal.

Specifically, in a polarization multiplexing system, a signal transmitted by a transmitting end may be represented by the following formula (for cases in which only a chromatic dispersion (Chromatic Dispersion, CD) and a first-order polarization mode dispersion (Polarization Mode Dispersion, PMD) are considered):

$$E_{TX} = [(\exp(j\phi_x) \exp(j\phi_y)]$$

After the signal is transmitted through a fiber, the signal received by a receiving end is as follows:

$$E_{Rx} = \begin{bmatrix} h_{11}\exp(j\phi_x) + h_{12}\exp(j\phi_y) \\ h_{21}\exp(j\phi_x) + h_{22}\exp(j\phi_y) \end{bmatrix}$$

Figure 9:
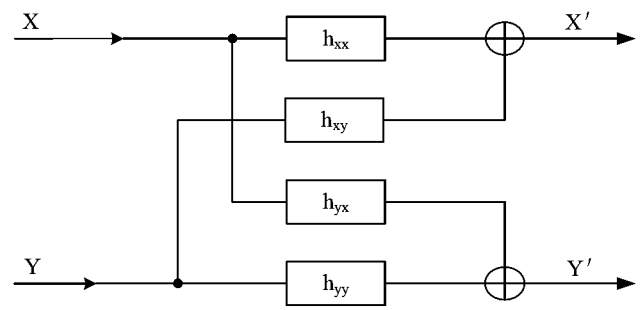
FIG. 9 is a schematic structural diagram of a dish-type equalizer provided by the present disclosure.

It can be seen that the signal received by the receiving end has a waveform distortion and a crosstalk between two polarization states. With respect to this case, the CMA algorithm may be used to demodulate data. The CMA algorithm may be specifically implemented using an equalizer in a dish-type structure, and is configured to compensate a linear cost of a fiber link and restore a polarization multiplexed signal. The equalizer in a dish-type structure may include four finite impulse response (Finite Impulse Response, FIR) filters. As shown in FIG. 9, the equalizer includes four parts $h_{ij}$(i, j∈{x, y}), and the output of the equalizer is as follows:

$$\begin{bmatrix} X' \\ Y' \end{bmatrix} = T_E T_C E_{Tx} = W \begin{bmatrix} \exp(j\phi_x) \\ \exp(j\phi_y) \end{bmatrix}$$

$$W = \begin{bmatrix} h_{xx}h_{11} + h_{xy}h_{21} & h_{xx}h_{12} + h_{xy}h_{22} \\ h_{yx}h_{11} + h_{yy}h_{21} & h_{yx}h_{12} + h_{yy}h_{22} \end{bmatrix}$$

where, $T_C$ represents a transmission matrix of a fiber transmission channel, $E_{Tx}$ represents uplink data loaded into the first polarized optical signal and the second polarized optical signal, $T_E$ represents a transmission matrix of the equalizer, W is equal to $T_E \Delta T_C$, and $h_{ij}$(i, j∈{x, y}) represents a coupling coefficient between two polarization states.

According to the output formula of the equalizer, the aim of the equalizer is to estimate an inverse matrix of the transmission matrix of the channel and further demodulate two polarization multiplexing signals. In this embodiment, the first receiver 16 can demodulate two polarized optical signals X' and Y' of the uplink signal using the foregoing formula, discard invalid data of the two polarized optical signals X' and Y', and obtain valid uplink data.

It should be noted that the two polarized optical signals that are perpendicular to each other in the uplink signal rotate during transmission in a fiber, but these two polarized optical signals are still perpendicular to each other, so that the original uplink data can be demodulated using the foregoing method.

Optionally, the director 15 of the second optical signal provided in this embodiment may be a circulator, where the circulator may include a first input port, a second input port, a first output port, and a second output port.

The first input port is configured to receive a downlink signal, and transmit the downlink signal to the PON terminal device through the first output port; the second input port is configured to receive an uplink signal, and input the uplink signal to the coherent receiver 24 through the second output port.

Using the passive optical network PON central office device provided by this embodiment of the present disclosure, downlink data is modulated to one polarization state of a downlink signal, where the other polarization state of the downlink signal is a DC optical signal; a PON terminal device splits a received downlink signal into two signals according to power, and separately rotates two polarization states of one of the two signals by 90 degrees. In this way, a polarized optical signal loaded with downlink data, in one signal split from the downlink signal, is parallel to a DC optical signal in the other signal; a DC optical signal in the two signals split from the downlink signal is used as a local-oscillator optical signal, and coherent mixing is performed on the DC optical signal and the polarized optical signal loaded with the downlink data, thereby avoiding using a laser and a polarization diversity structure on the terminal device, reducing complexity of the device and a system, and reducing costs.

In the embodiments provided in FIG. 5 to FIG. 8, the PON central office device modulates downlink data into one polarization state of a downlink signal, where the other polarization state of the downlink signal is a DC optical signal; after receiving the downlink signal, the PON terminal device splits the downlink signal into a first signal and a second signal according to power, and separately rotates two polarization states of the second signal by 90 degrees. In this way, a polarized optical signal loaded with data, in any one signal of the first signal and the second signal, is parallel to a DC optical signal in the other signal; a DC optical signal in the first signal and the second signal is used as a local-oscillator optical signal, and coherent mixing is performed on the DC optical signal and the polarized optical signal loaded with the data, thereby reducing the numbers of lasers and polarization diversity structures on the terminal device, reducing a complexity of the device and a system, and reducing costs.

Further, in the embodiment of the PON terminal device illustrated in FIG. 7, the PON terminal device may also split the received downlink signal into a third signal and a fourth signal according to power, use the third signal for coherent mixing reception, but load an uplink signal to the fourth signal, and then transmit the fourth signal to the PON central office device. Accordingly, in the embodiment of the PON central office device illustrated in FIG. 8, after receiving an uplink signal, the PON central office device may use the signal light generated by the signal source 11 as a local-oscillator light, and perform coherent reception on the signal light generated by the signal source 11 and the uplink signal. In addition, because the PON terminal device has modulated an uplink signal on the two polarized optical signals of the uplink signal, the PON central office device can demodulate, using an algorithm, for example, a CMA algorithm, valid data loaded into the second polarized optical signal of the uplink signal, and discard invalid data loaded into the first polarized optical signal.

As another feasible implementation manner, the PON central office device can also have the structures illustrated in FIG. 6 and FIG. 7. Accordingly, the PON terminal device can also have the structures illustrated in FIG. 5 and FIG. 8.

Figure 10:
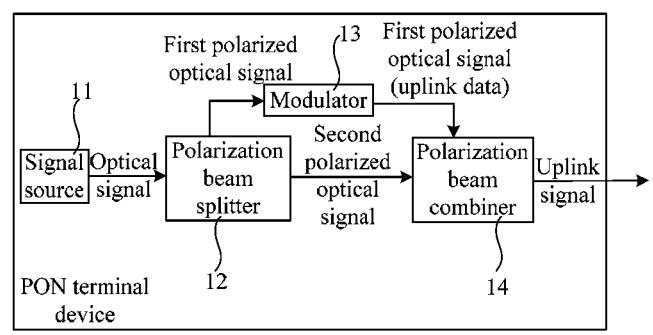
FIG. 10 is a schematic structural diagram of another embodiment of a PON terminal device provided by the present disclosure.

Specifically:

FIG. 10 is a schematic structural diagram of another embodiment of a passive optical network PON terminal device provided by the present disclosure. As shown in FIG. 10, the PON terminal device includes a transmitter provided by an embodiment of the present disclosure, where the transmitter is named a third transmitter herein. The third transmitter includes a signal source 11, a polarization beam splitter 12, a modulator 13, and a polarization beam combiner 14, where first data is uplink data, a first transmit signal is an uplink signal, and a receiving end is a PON central office device.

Figure 11:
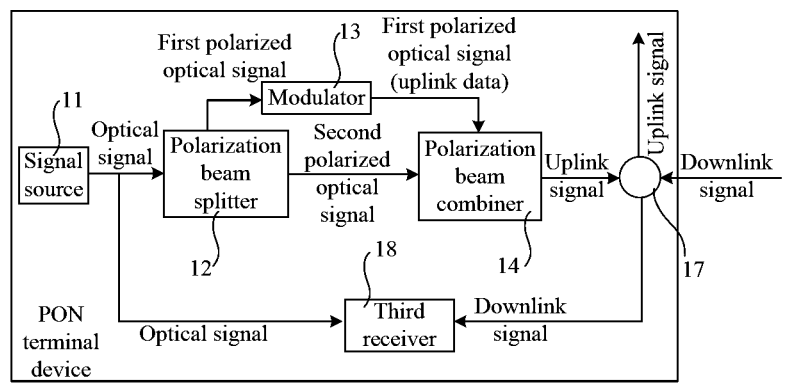
FIG. 11 is a schematic structural diagram of still another embodiment of a PON terminal device provided by the present disclosure.

FIG. 11 is a schematic structural diagram of still another embodiment of a passive optical network PON terminal device provided by the present disclosure. As shown in FIG. 11, the PON terminal device may further include a director 17 of a third optical signal and a third receiver 18, where:

the director 17 of the third optical signal is configured to transmit the uplink signal synthesized by the polarization beam combiner 14 to the PON central office device, receive a downlink signal sent by the PON central office device, and input the downlink signal to the third receiver 18, where the downlink signal includes a first polarized optical signal and a second polarized optical signal, where the first polarized optical signal and the second polarized optical signal are loaded with downlink data;

the signal source 11 may be further configured to input a generated optical signal to the third receiver; and the third receiver 18 is configured to perform coherent mixing on the first transmit signal and the optical signal to obtain the downlink data.

Optionally, the third receiver 18 may be specifically configured to demodulate, using a constant modulus algorithm CMA, the first polarized optical signal and the second polarized signal of the downlink signal to obtain the downlink data loaded into the second polarized optical signal of the downlink signal, and discard invalid data loaded into the second polarized optical signal of the downlink signal, where the downlink signal is obtained by the PON central office device by loading downlink data into a fourth signal which is split from the uplink signal according to power.

Optionally, the director 17 of the third optical signal may be a circulator, where the circulator includes a first input port, a second input port, a first output port, and a second output port.

The first input port is configured to receive an uplink signal, and transmit the uplink signal to the PON central office device through the first output port; the second input port is configured to receive a downlink signal, and input the downlink signal to the third receiver through the second output port.

Figure 12:
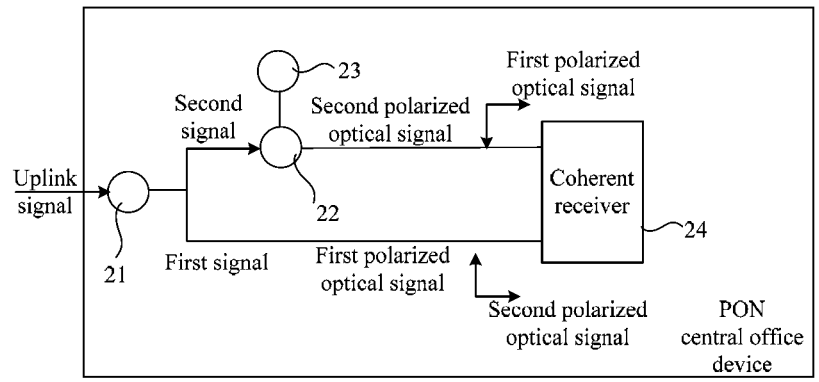
FIG. 12 is a schematic structural diagram of another embodiment of a PON central office device provided by the present disclosure.

FIG. 12 is a schematic structural diagram of another embodiment of a passive optical network PON central office device provided by the present disclosure. As shown in FIG. 12, the PON central office device includes a receiver provided by an embodiment of the present disclosure, where the receiver is named a fourth receiver and includes a first power splitter 21, a director 22 of a first optical signal, a polarization rotator 23 of light, and a coherent receiver 24, where first data is uplink data, a first transmit signal is an uplink signal, and a transmitting end is a PON terminal device.

Figure 13:
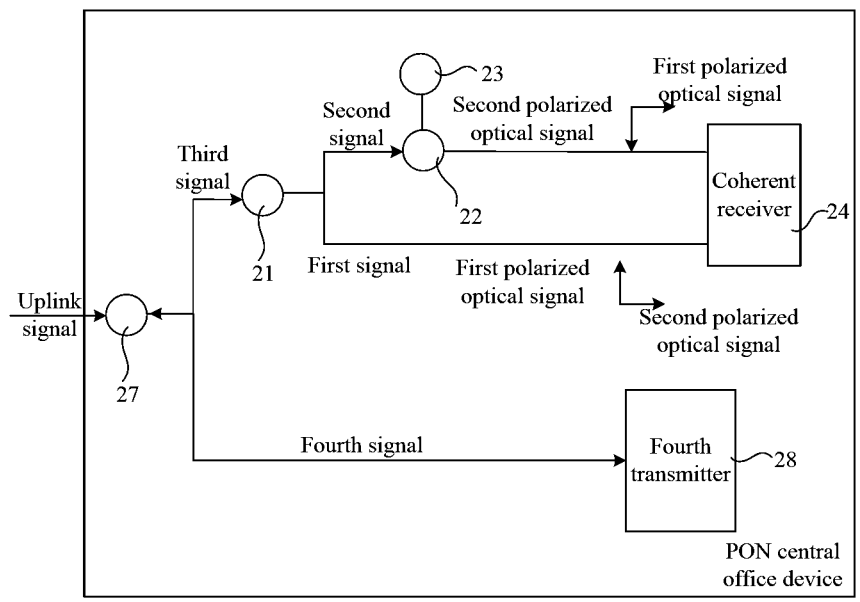
FIG. 13 is a schematic structural diagram of another embodiment of a PON central office device provided by the present disclosure.

FIG. 13 is a schematic structural diagram of another embodiment of a passive optical network PON central office device provided by the present disclosure. As shown in FIG. 13, the PON central office device may further include a second power splitter 27 and a fourth transmitter 28, where:

the second power splitter 27 is configured to split a downlink signal sent by the PON central office device into a third signal and a fourth signal according to power, input the third signal to a first power splitter for coherent reception, and input the fourth signal to the fourth transmitter 28; and the fourth transmitter 28 is configured to modulate the fourth signal, load downlink data into a first polarized optical signal and a second polarized optical signal of the fourth signal, and transmit the modulated fourth signal as a downlink signal to the PON terminal device.

In the embodiments provided in FIG. 10 to FIG. 13, the PON terminal device modulates uplink data into one polarization state of an uplink signal, where the other polarization state of the uplink signal is a DC optical signal; after receiving the uplink signal, the PON central office device splits the uplink signal into a first signal and a second signal according to power, and separately rotates two polarization states of the second signal by 90 degrees. In this way, a polarized optical signal loaded with data, in any one signal of the first signal and the second signal, is parallel to a DC optical signal in the other signal; a DC optical signal in the first signal and the second signal is used as a local-oscillator optical signal, and coherent mixing is performed on the DC optical signal and the polarized optical signal loaded with the data, thereby reducing the numbers of lasers and polarization diversity structures on the central office device, reducing complexity of the device and a system and reducing costs.

Further, the PON central office device may also split the received uplink signal into a third signal and a fourth signal according to power, use the third signal for coherent mixing reception, but load the uplink signal to the fourth signal, and then transmit the fourth signal to the PON terminal device. Accordingly, after receiving a downlink signal, the PON terminal device may use the signal light generated by the signal source 11 as a local-oscillator light and perform coherent reception on the signal light generated by the signal source 11 and the downlink signal. In addition, because the PON central office device has modulated a downlink signal on the two polarized optical signals of the downlink signal, the PON terminal device can demodulate, using an algorithm, for example, a CMA algorithm, valid data loaded into the second polarized optical signal of the downlink signal, and discard invalid data loaded into the first polarized optical signal.

In the embodiments provided in FIG. 10 to FIG. 13, for details about processes of transmitting a signal by the PON terminal device and the PON central office device, reference may be made to related descriptions of the embodiments in FIG. 1 to FIG. 8, which are not further described herein.

The present disclosure also provides a passive optical network PON system, where the PON system includes at least one PON central office device 1 provided by an embodiment of the present disclosure and at least one PON terminal device 2 provided by an embodiment of the present disclosure.

Figure 14A:
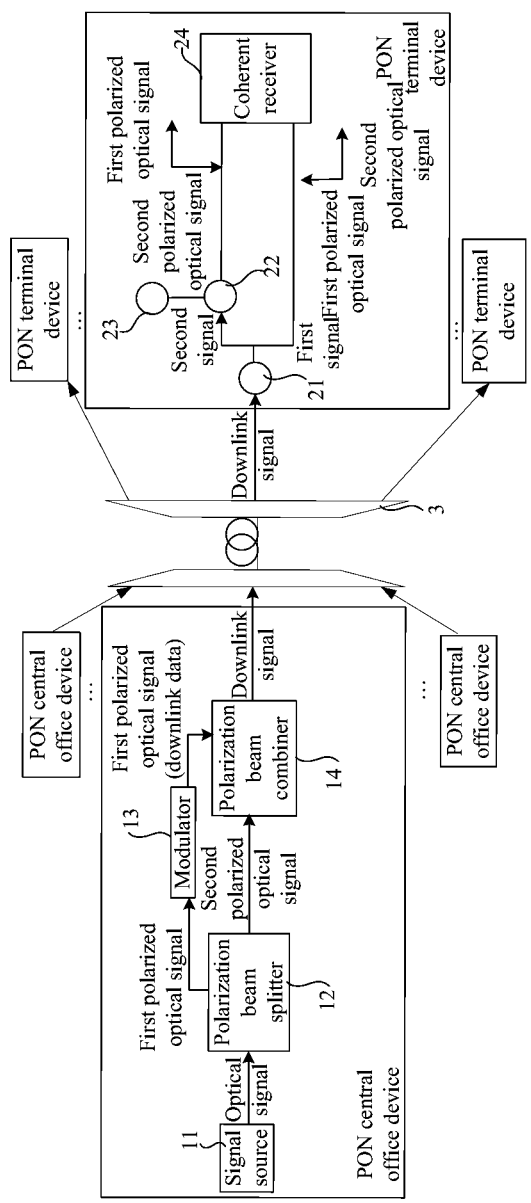
FIG. 14a and FIG. 14b are schematic structural diagrams of an embodiment of a passive optical network PON system provided by the present disclosure.
Figure 14B:
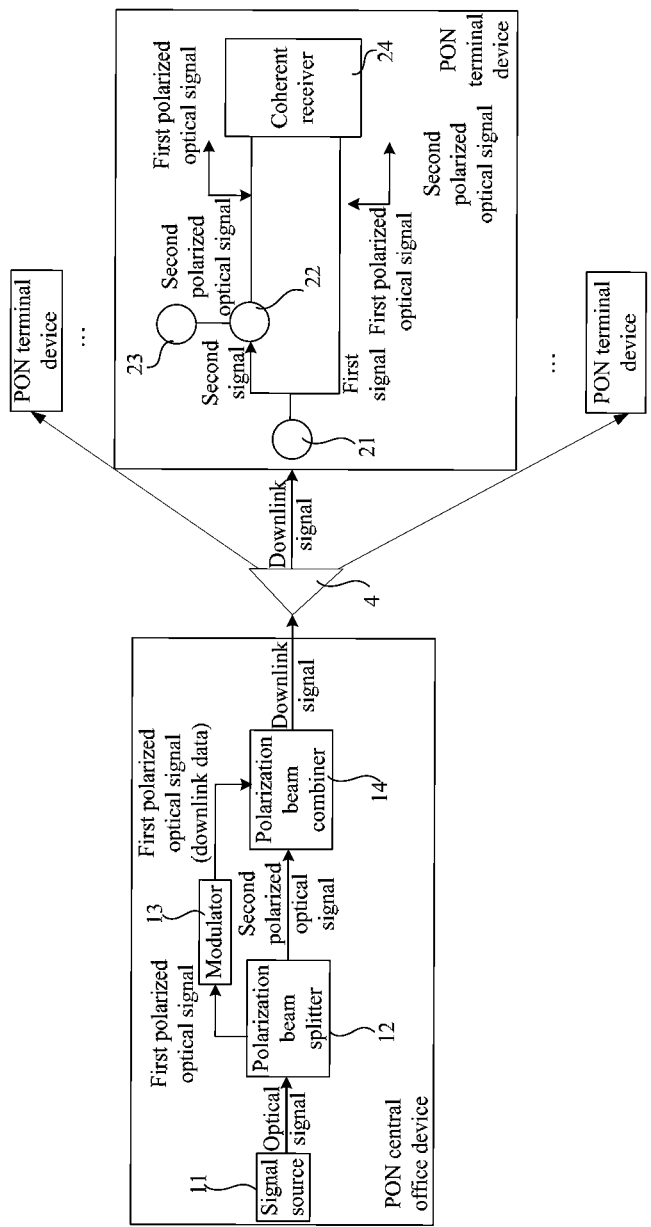

FIG. 14a and FIG. 14b are schematic structural diagrams of an embodiment of a passive optical network PON system. The PON central office device 1 in the PON system includes a first transmitter, where the first transmitter includes a signal source 11, a polarization beam splitter 12, a modulator 13, and a polarization beam combiner 14.

The signal source 11 is configured to generate an optical signal, and input the optical signal to the polarization beam splitter 12; the polarization beam splitter 12 is configured to split the optical signal into a first polarized optical signal and a second polarized optical signal that are perpendicular to each other, input the first polarized optical signal to the modulator 13, and input the second polarized optical signal to the polarization beam combiner 14; the modulator 13 is configured to modulate the first polarized optical signal, load first data into the first polarized optical signal, and input the modulated first polarized optical signal to the polarization beam combiner 14; and the polarization beam combiner 14 is configured to synthesize the modulated first polarized optical signal and the second polarized optical signal into a first transmit signal, and transmit the first transmit signal to a receiving end. First data transmitted by the first transmitter is downlink data, the first transmit signal is a downlink signal, and the receiving end of the first transmit signal is a PON terminal device.

The PON terminal device 2 in the system includes a second receiver, where the second receiver includes a first power splitter 21, a director 22 of an optical signal, a polarization rotator 23 of light, and a coherent receiver 24.

The first power splitter 21 is configured to split a first transmit signal sent by a transmitting end into a first signal and a second signal according to power, input the first signal to the coherent receiver 24, and input the second signal to the director 22 of the first optical signal, where the first transmit signal includes a first polarized optical signal and a second polarized optical signal that are perpendicular to each other, where the first polarized optical signal is loaded with first data; the director 22 of the first optical signal is connected to the polarization rotator 23 of light, and is configured to input the second signal to the polarization rotator 23 of light; the polarization rotator 23 of light is configured to separately rotate a first polarized optical signal and a second polarized optical signal of the second signal by 90 degrees, and input the rotated second signal to the director 22 of the first optical signal; the director 22 of the first optical signal is further configured to input the rotated second signal to the coherent receiver 24; and the coherent receiver 24 is configured to perform coherent mixing on the rotated second signal and the first signal to obtain the first data. The first data is downlink data, the first transmit signal is a downlink signal, and the transmitting end is a PON central office device.

As shown in FIG. 14a, in the passive optical network PON system provided by this embodiment of the present disclosure, the PON central office device 1 and the PON terminal device 2 can be connected using a wavelength division multiplexing (Wavelength Division Multiplexing, WDM) device 3 and communicate in a WDM manner. In this embodiment, each ONU uses one wavelength exclusively.

As shown in FIG. 14b, in the passive optical network PON system provided by this embodiment of the present disclosure, the PON central office device 1 and the PON terminal device 2 can be connected using an optical splitter (Splitter) 4 and communicate in a time division multiplexing access (Time Division Multiplexing Access, TDMA) manner. In this embodiment, the splitter is configured to allocate power to each ONU, so that multiple ONUs share one wavelength.

Figure 15A:
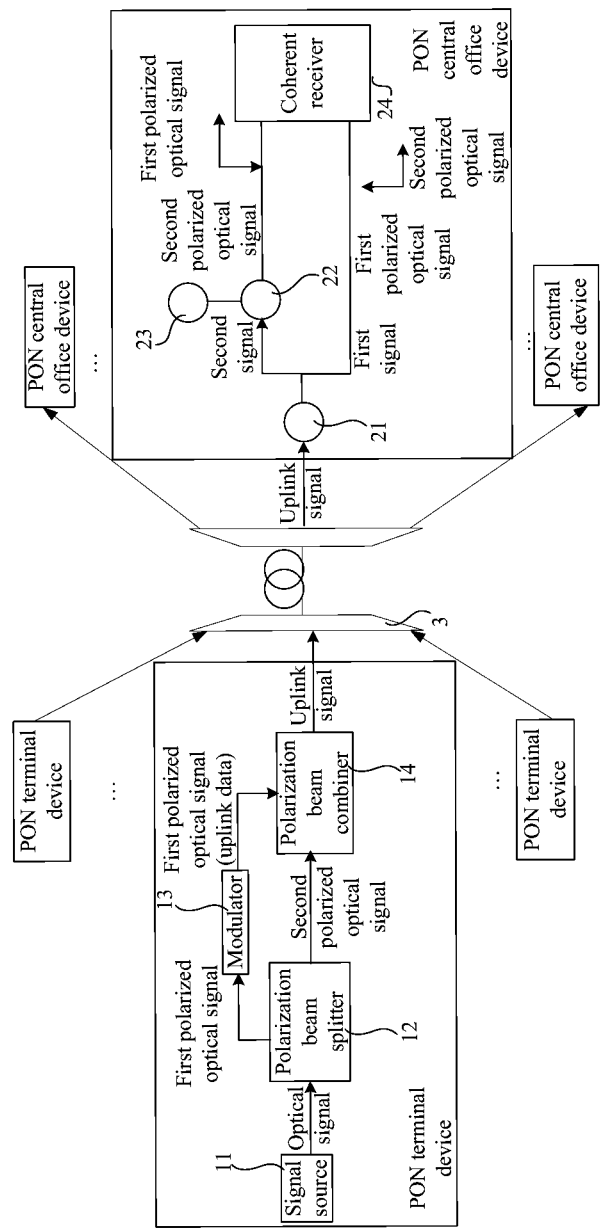
FIG. 15a and FIG. 15b are schematic structural diagrams of another embodiment of a passive optical network PON system provided by the present disclosure.
Figure 15B:
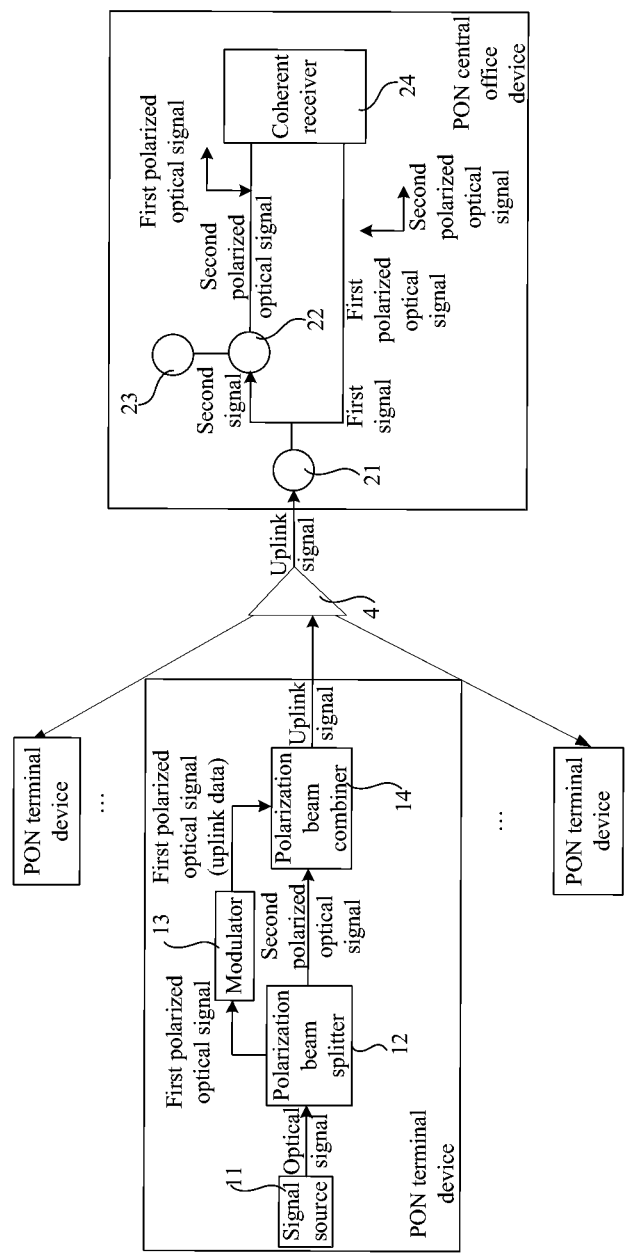

FIG. 15a and FIG. 15b are schematic structural diagrams of another embodiment of a passive optical network PON system. A PON central office device 1 in the system includes a fourth receiver, where the fourth receiver includes a first power splitter 21, a director 22 of a first optical signal, a polarization rotator 23 of light, and a coherent receiver 24, where:

the first power splitter 21 is configured to split a first transmit signal sent by a transmitting end into a first signal and a second signal according to power, input the first signal to the coherent receiver 24, and input the second signal to the director 22 of the first optical signal, where the first transmit signal includes a first polarized optical signal and a second polarized optical signal that are perpendicular to each other, where the first polarized optical signal is loaded with first data; the director 22 of the first optical signal is connected to the polarization rotator 23 of light, and is configured to input the second signal to the polarization rotator 23 of light; the polarization rotator 23 of light is configured to separately rotate a first polarized optical signal and a second polarized optical signal of the second signal by 90 degrees, and input the rotated second signal to the director 22 of the first optical signal; the director 22 of the first optical signal is further configured to input the rotated second signal to the coherent receiver 24; and the coherent receiver 24 is configured to perform coherent mixing on the rotated second signal and the first signal to obtain the first data. The first data is uplink data, the first transmit signal is an uplink signal, and the transmitting end is a PON terminal device.

The PON terminal device 2 in the system includes a third transmitter, where the third transmitter includes a signal source 11, a polarization beam splitter 12, a modulator 13, and a polarization beam combiner 14, where:

the signal source 11 is configured to generate an optical signal, and input the optical signal to the polarization beam splitter 12; the polarization beam splitter 12 is configured to split the optical signal into a first polarized optical signal and a second polarized optical signal that are perpendicular to each other, input the first polarized optical signal to the modulator 13, and input the second polarized optical signal to the polarization beam combiner 14; the modulator 13 is configured to modulate the first polarized optical signal, load first data into the first polarized optical signal, and input the modulated first polarized optical signal to the polarization beam combiner 14; and the polarization beam combiner 14 is configured to synthesize the modulated first polarized optical signal and the second polarized optical signal into a first transmit signal, and transmit the first transmit signal to a receiving end. The first data is uplink data, the first transmit signal is an uplink signal, and the receiving end is a PON central office device.

As shown in FIG. 15a, in the passive optical network PON system provided by this embodiment of the present disclosure, the PON central office device 1 and the PON terminal device 2 can be connected using a WDM device 3 and communicate in a WDM manner. In this embodiment, each ONU uses one wavelength exclusively.

As shown in FIG. 15b, in the passive optical network PON system provided by this embodiment of the present disclosure, the PON central office device 1 and the PON terminal device 2 can be connected using an optical splitter (Splitter) 4 and communicate in a TDMA manner. In this embodiment, the splitter is configured to allocate power to each ONU, so that multiple ONUs share one wavelength.

Using the passive optical network PON system provided by this embodiment of the present disclosure, a transmitting end modulates data to one polarization state of a transmit signal, where the other polarization state of the transmit signal is a DC optical signal; a receiving end splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a central office device or a terminal device, reducing complexity of the device and the system, and reducing costs.

Figure 16:
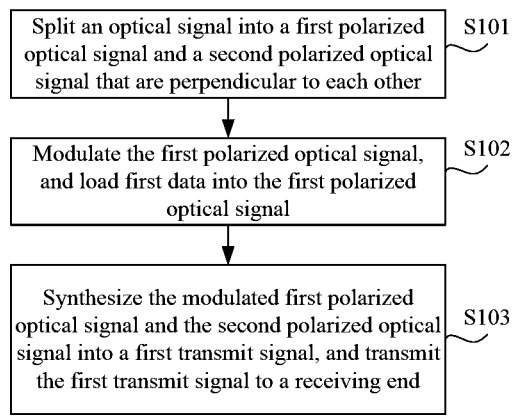
FIG. 16 is a flowchart of an embodiment of a signal transmission method provided by the present disclosure.

FIG. 16 is a flowchart of an embodiment of a signal transmission method provided by the present disclosure. As shown in FIG. 16, the method includes:

S101. Split an optical signal into a first polarized optical signal and a second polarized optical signal that are perpendicular to each other.

S102. Modulate the first polarized optical signal, and load first data into the first polarized optical signal.

S103. Synthesize the modulated first polarized optical signal and the second polarized optical signal into a first transmit signal, and transmit the first transmit signal to a receiving end, where the first data is uplink data and the first transmit signal is an uplink signal, or the first data is downlink data and the transmit signal is a downlink signal.

The foregoing steps may be performed by a PON central office device. In this case, the first transmit signal is a downlink signal, the first data is downlink data, and the receiving end is a PON terminal device; the foregoing steps may also be performed by a PON terminal device. In this case, the first transmit signal is an uplink signal, the first data is uplink data, and the receiving end is a PON central office device. For details about a specific process of transmitting a signal in the method embodiment, reference may be made to the related descriptions of the transmitter embodiment provided by the present disclosure, which is not further described herein.

Using the signal transmission method provided by this embodiment of the present disclosure, a transmitting end modulates data to one polarization state of a transmit signal, where the other polarization state of the transmit signal is a DC optical signal; a receiving end splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a central office device or a terminal device, reducing complexity of the device and a system, and reducing costs.

Figure 17:
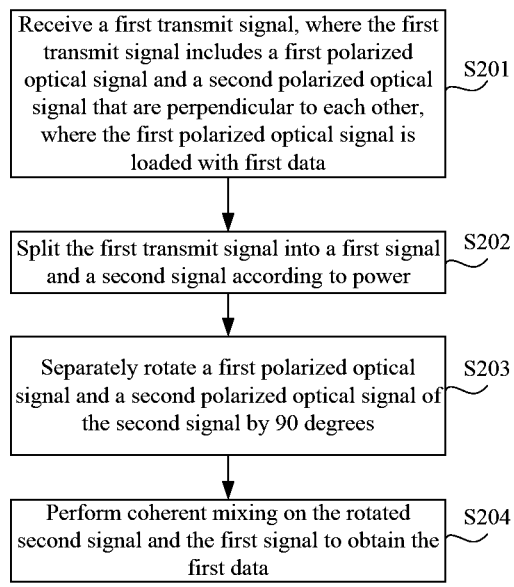
FIG. 17 is a flowchart of an embodiment of a signal receiving method provided by the present disclosure.

FIG. 17 is a flowchart of an embodiment of a signal receiving method provided by the present disclosure. As shown in FIG. 17, the method includes:

S201. Receive a first transmit signal, where the first transmit signal includes a first polarized optical signal and a second polarized optical signal that are perpendicular to each other, where the first polarized optical signal is loaded with first data, the first transmit signal is an uplink signal, and the first data is uplink data, or the first transmit signal is a downlink signal and the first data is downlink data.

S202. Split the first transmit signal into a first signal and a second signal according to power.

S203. Separately rotate a first polarized optical signal and a second polarized optical signal of the second signal by 90 degrees.

S204. Perform coherent mixing on the rotated second signal and the first signal to obtain the first data.

The foregoing steps may be performed by a PON terminal device. In this case, the first transmit signal is a downlink signal, the first data is downlink data, and the transmitting end is a PON central office device; the foregoing steps may also be performed by a PON central office device. In this case, the first transmit signal is an uplink signal, the first data is uplink data, and the transmitting end is a PON terminal device. For details about a specific process of receiving a signal in the method embodiment, reference may be made to the related descriptions of the receiver embodiment provided by the present disclosure, which is not further described herein.

Using the signal receiving method provided by this embodiment of the present disclosure, a transmitting end modulates data to one polarization state of a transmit signal, where the other polarization state of the transmit signal is a DC optical signal; a receiving end splits a received signal into two signals according to power, and separately rotates two polarization states of one of the two signals by 90 degrees. In this way, a polarized optical signal loaded with data, in one signal split from the received signal, is parallel to a DC optical signal in the other signal; a DC optical signal in the two signals split from the received signal is used as a local-oscillator optical signal, and coherent mixing is performed on the DC optical signal and the polarized optical signal loaded with the data, thereby reducing the numbers of lasers and polarization diversity structures on a central office device or a terminal device, reducing complexity of the device and a system, and reducing costs.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A receiver, comprising a first power splitter, a first director of a first optical signal, a polarization rotator of light, and a coherent receiver, wherein the first power splitter splits a first transmit signal sent by a transmitting end into a first signal and a second signal according to power, inputs the first signal to the coherent receiver, and inputs the second signal to the first director of the first optical signal, wherein the first transmit signal comprises a first polarized optical signal and a second polarized optical signal having polarizations that are perpendicular to each other, wherein the first polarized optical signal is loaded with first data;

the first director of the first optical signal is connected to the polarization rotator of light, and the first director of the first optical signal is configured to input the second signal to the polarization rotator of light;

the polarization rotator of light separately rotates a first polarized optical signal and a second polarized optical signal of the second signal by 90 degrees, and inputs the rotated second signal to the first director of the first optical signal; and the first director of the first optical signal inputs the rotated second signal to the coherent receiver; and the coherent receiver performs coherent mixing on the rotated second signal and the first signal to obtain the first data.

2. The receiver according to claim 1, wherein the coherent receiver comprises an optical hybrid, an optical-to-electrical converter, an analog to digital converter, and a digital signal processor, wherein the optical hybrid performs coherent mixing on the rotated second signal and the first signal and outputs four channels of optical signals;

the optical-to-electrical converter performs optical-to-electrical conversion on the four channels of optical signals to output two channels of electrical signals;

the analog to digital converter is configured to perform analog to digital conversion on the two channels of electrical signals; and the digital signal processor is configured to perform digital processing on the two channels of electrical signals that are output after the analog to digital conversion to obtain the first data.

3. The receiver according to claim 1, wherein the first director of the first optical signal includes a circulator, and the circulator comprises a first input port, a second input port, a first output port, and a second output port, wherein the first input port receives the first transmit signal, and inputs the first transmit signal to the polarization rotator of light through the first output port; the second input port receives the rotated second signal, and inputs the rotated second signal to the first coherent receiver through the second output port.

4. The receiver according to claim 1, wherein the polarization rotator of light includes a Faraday rotation mirror FRM, and the FRM comprises a Faraday rotator FR and a reflective mirror, wherein
the FR separately rotates the first polarized optical signal and the second polarized optical signal of the second signal by 45 degrees, the second signal that has been rotated by 45 degrees is reflected back to the FR by the reflective mirror, and the FR separately rotates the first polarized optical signal and the second polarized optical signal of the second signal that have been rotated by 45 degrees by 45 degrees again.

5. A passive optical network (PON) terminal device, comprising the receiver of claim 1, wherein the first data is downlink data, the first transmit signal is a downlink signal, and the transmitting end is a PON central office device.

6. The PON terminal device according to claim 5, further comprising a second power splitter and a second transmitter, wherein
the second power splitter splits the downlink signal sent by the PON central office device into a third signal and a fourth signal according to power, inputs the third signal to the first power splitter for coherent reception, and inputs the fourth signal to the second transmitter; and
the second transmitter modulates the fourth signal, loads uplink data into a first polarized optical signal and a second polarized optical signal of the fourth signal, and transmits the modulated fourth signal as an uplink signal to the PON central office device.

7. A passive optical network (PON) central office device, comprising the receiver of claim 1, wherein the first data is uplink data, the first transmit signal is an uplink signal, and the transmitting end is a PON terminal device.

8. A passive optical network (PON) central office device, comprising a transmitter, wherein the transmitter comprises a signal source, a polarization beam splitter, a modulator, and a polarization beam combiner, wherein
the signal source generates an optical signal, and inputs the optical signal to the polarization beam splitter;
the polarization beam splitter splits the optical signal into a first polarized optical signal and a second polarized optical signal having polarizations that are perpendicular to each other, inputs the first polarized optical signal to the modulator, and inputs the second polarized optical signal to the polarization beam combiner;
the modulator modulates the first polarized optical signal, loads first data into the first polarized optical signal, and inputs the modulated first polarized optical signal to the polarization beam combiner; and
the polarization beam combiner synthesizes the modulated first polarized optical signal and the second polarized optical signal into a first transmit signal, and transmits the first transmit signal to a receiving end;
wherein the first data is downlink data, the first transmit signal is a downlink signal, and the receiving end is a PON terminal device;
wherein the PON central office device further comprising: a second director of a second optical signal and a first receiver, wherein
the second director of the second optical signal transmits the downlink signal synthesized by the polarization beam combiner to the PON terminal device, receives an uplink signal sent by the PON terminal device, and inputs the uplink signal to the first receiver, wherein the uplink signal comprises a first polarized optical signal and a second polarized optical signal having polarizations that are perpendicular to each other, wherein the first polarized optical signal and the second polarized optical signal are loaded with uplink data;
the signal source inputs the generated optical signal to the first receiver; and
the first receiver performs coherent mixing on the first transmit signal and the optical signal to obtain the uplink data.

9. The PON central office device according to claim 8, wherein the first receiver demodulates, using a constant modulus algorithm CMA, the first polarized optical signal and the second polarized optical signal of the uplink signal to obtain the uplink data loaded into the second polarized optical signal of the uplink signal and discards invalid data loaded into the second polarized optical signal of the uplink signal, wherein the uplink signal is obtained by the PON terminal device by loading the uplink data into a fourth signal which is split from the downlink signal according to power.

10. The PON central office device according to claim 8, wherein the second director of the second optical signal includes a circulator, and the circulator comprises a first input port, a second input port, a first output port, and a second output port, wherein
the first input port receives the downlink signal, and transmits the downlink signal to the PON terminal device through the first output port; and the second input port receives the uplink signal and inputs the uplink signal to the first receiver through the second output port.

11. A passive optical network (PON) terminal device, comprising a transmitter, wherein the transmitter comprises a signal source, a polarization beam splitter, a modulator, and a polarization beam combiner, wherein
the signal source generates an optical signal, and inputs the optical signal to the polarization beam splitter;
the polarization beam splitter splits the optical signal into a first polarized optical signal and a second polarized optical signal having polarizations that are perpendicular to each other, inputs the first polarized optical signal to the modulator, and inputs the second polarized optical signal to the polarization beam combiner;
the modulator modulates the first polarized optical signal, loads first data into the first polarized optical signal, and inputs the modulated first polarized optical signal to the polarization beam combiner;
the polarization beam combiner synthesizes the modulated first polarized optical signal and the second polarized optical signal into a first transmit signal, and transmits the first transmit signal to a receiving end;
wherein the first data is uplink data, the first transmit signal is an uplink signal, and the receiving end is a PON central office device;
wherein the terminal device further comprising a third director of a third optical signal and a third receiver, wherein
the third director of the third optical signal transmits the uplink signal synthesized by the polarization beam combiner to the PON central office device, receives a downlink signal sent by the PON central office device, and inputs the downlink signal to the third receiver, wherein the downlink signal comprises a first polarized optical signal and a second polarized optical signal, wherein the first polarized optical signal and the second polarized optical signal are loaded with downlink data;
the signal source inputs the generated optical signal to the third receiver; and the third receiver performs coherent mixing on the second transmit signal and the optical signal to obtain the downlink data.

12. The PON terminal device according to claim 11, wherein the third receiver demodulates, using a constant modulus algorithm CMA, the first polarized optical signal and the second polarized optical signal of the downlink signal to obtain the downlink data loaded into the second polarized optical signal of the downlink signal and discards invalid data loaded into the second polarized optical signal of the downlink signal, wherein the downlink signal is obtained by the PON central office device by loading the downlink data into a fourth signal which is split from the uplink signal according to power.

13. The PON terminal device according to claim 11, wherein the third director of the third optical signal includes a circulator, and the circulator comprises a first input port, a second input port, a first output port, and a second output port, wherein
the first input port receives the uplink signal, and transmits the uplink signal to the PON central office device through the first output port; and the second input port receives the downlink signal, and inputs the downlink signal to the third receiver through the second output port.

14. A passive optical network (PON) system, comprising at least one PON central office device and at least one PON terminal device
wherein the at least one PON central office device comprises a first transmitter, wherein the first transmitter comprises a signal source, a polarization beam splitter, a modulator, and a polarization beam combiner, wherein
the signal source generates an optical signal, and inputs the optical signal to the polarization beam splitter;
the polarization beam splitter splits the optical signal into a first polarized optical signal and a second polarized optical signal having polarizations that are perpendicular to each other, inputs the first polarized optical signal to the modulator, and inputs the second polarized optical signal to the polarization beam combiner;
the modulator modulates the first polarized optical signal, loads first data into the first polarized optical signal, and inputs the modulated first polarized optical signal to the polarization beam combiner; and
the polarization beam combiner synthesizes the modulated first polarized optical signal and the second polarized optical signal into a first transmit signal, and transmits the first transmission signal to a receiving end, wherein the first data is downlink data, the first transmit signal is a downlink signal, and the receiving end is the at least one PON terminal device;
wherein the at least one PON terminal device comprises a receiver, wherein the receiver comprises a first power splitter, a first director of a first optical signal, a polarization rotator of light, and a coherent receiver, wherein
the first power splitter splits a first transmit signal sent by a transmitting end into a first signal and a second signal according to power, inputs the first signal to the coherent receiver, and inputs the second signal to the first director of the first optical signal, wherein the first transmit signal comprises a first polarized optical signal and a second polarized optical signal having polarizations that are perpendicular to each other, wherein the first polarized optical signal includes first data;

the first director of the first optical signal is connected to the polarization rotator of light, and the first director of the first optical signal inputs the second signal to the polarization rotator of light;
the polarization rotator of light separately rotates a first polarized optical signal and a second polarized optical signal of the second signal by 90 degrees, and input the rotated second signal to the first director of the first optical signal; and the first director of the first optical signal inputs the rotated second signal to the coherent receiver; and
the coherent receiver performs coherent mixing on the rotated second signal and the first signal to obtain the first data; wherein the first data is downlink data, the first transmit signal is a downlink signal, and the transmitting end is the at least one PON central office device.

15. A passive optical network (PON) system, comprising at least one PON terminal device and at least one PON central office device;
wherein the at least one PON terminal device comprises a first transmitter, wherein the first transmitter comprises a signal source, a polarization beam splitter, a modulator, and a polarization beam combiner, wherein
the signal source generates an optical signal, and inputs the optical signal to the polarization beam splitter;
the polarization beam splitter splits the optical signal into a first polarized optical signal and a second polarized optical signal having polarizations that are perpendicular to each other, inputs the first polarized optical signal to the modulator, and inputs the second polarized optical signal to the polarization beam combiner;
the modulator modulates the first polarized optical signal, loads first data into the first polarized optical signal, and inputs the modulated first polarized optical signal to the polarization beam combiner; and
the polarization beam combiner synthesizes the modulated first polarized optical signal and the second polarized optical signal into a first transmit signal, and transmits the first transmission signal to a receiving end, wherein the first data is uplink data, the first transmit signal is an uplink signal, and the receiving end is the at least one PON central office device;
wherein the at least one PON central office device comprises a receiver, wherein the receiver comprises a first power splitter, a first director of a first optical signal, a polarization rotator of light, and a coherent receiver, wherein
the first power splitter splits a first transmit signal sent by a transmitting end into a first signal and a second signal according to power, inputs the first signal to the coherent receiver, and inputs the second signal to the first director of the first optical signal, wherein the first transmit signal comprises a first polarized optical signal and a second polarized optical signal having polarizations that are perpendicular to each other, wherein the first polarized optical signal includes the first data;
the first director of the first optical signal is connected to the polarization rotator of light, and the first director of the first optical signal inputs the second signal to the polarization rotator of light;
the polarization rotator of light separately rotates a first polarized optical signal and a second polarized optical signal of the second signal by 90 degrees, and inputs the rotated second signal to the first director of the first optical signal; and the first director of the first optical signal inputs the rotated second signal to the coherent receiver; and the coherent receiver performs coherent mixing on the rotated second signal and the first signal to obtain the first data, wherein the first data is uplink data, the first transmit signal is an uplink signal, and the transmitting end is a PON terminal device.

16. A signal receiving method, comprising:
receiving a first transmit signal, wherein the first transmit signal comprises a first polarized optical signal and a second polarized optical signal having polarizations that are perpendicular to each other, wherein the first polarized optical signal includes first data, the first transmit signal is an uplink signal, and the first data is uplink data, or the first transmit signal is a downlink signal and the first data is downlink data;
splitting the first transmit signal into a first signal and a second signal according to power;
separately rotating a first polarized optical signal and a second polarized optical signal of the second signal by 90 degrees; and
performing coherent mixing on the rotated second signal and the first signal to obtain the first data.

\* \* \* \* \*